(No Model.)

J. W. BEEBE.
TROLLEY FOR ELECTRIC CARS.

No. 468,779. Patented Feb. 16, 1892.

WITNESSES:
Francis E. Holleran.
John J. Marsden

INVENTOR
John W. Beebe
BY F. F. Warner
his ATTORNEY.

UNITED STATES PATENT OFFICE.

JOHN W. BEEBE, OF WATERLOO, NEW YORK.

TROLLEY FOR ELECTRIC CARS.

SPECIFICATION forming part of Letters Patent No. 468,779, dated February 16, 1892.

Application filed March 10, 1891. Serial No. 384,441. (No model.)

*To all whom it may concern:*

Be it known that I, JOHN W. BEEBE, a citizen of the United States, and a resident of Waterloo, in the county of Seneca and State of New York, have invented certain new and useful Improvements in Trolleys for Electric Cars, of which the following is a specification.

My invention relates to trolleys of the class usually employed in connection with street-cars propelled electrically by means known as the "overhead system." I aim to diminish the friction of the trolley-wheel on its bearings; to prevent loss of force resulting from accumulation of snow or ice on the overhead wire; to insure a constant circuit between said wire and the motor, notwithstanding the swaying or rocking movement of the car, and to improve the construction and operation of the trolley device in other respects, all of which will be hereinafter more fully explained and set forth in connection with the accompanying drawings, in which—

Figure 1:
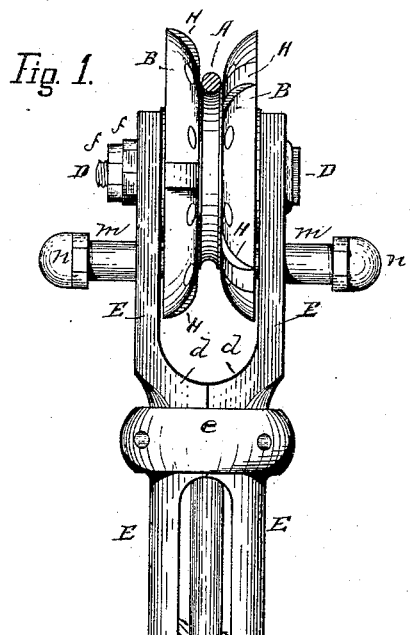
Figure 2:
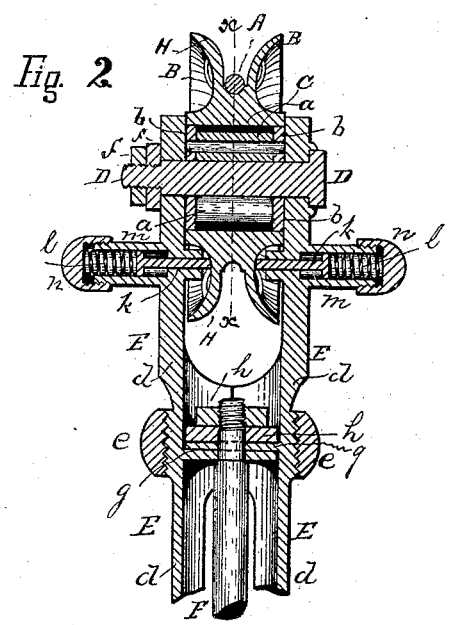
Figure 3:
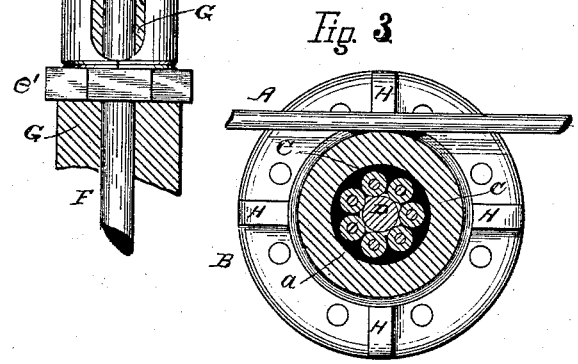
Figure 4:
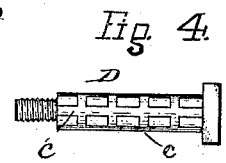

Figure 1 is a representation of my improved trolley device viewed in the direction of the edge or periphery of the trolley-wheel; Fig. 2, a vertical central cross-section of the parts shown in Fig. 1; Fig. 3, a vertical section in the plane of the line $x\ x$ of Fig. 2; and Fig. 4 is a representation in detail of the trolley-axle or bearing-pin.

Like letters of reference indicate like parts.

A represents the overhead wire, and B the trolley wheel or roller, which is deeply grooved on its periphery and flaring toward its sides, as usual, to insure constant contact with the said wire.

$a$ is a comparatively large concentric opening extending across said wheel, and $b\ b$ are annular plates fitted into the ends of this opening and secured there, if need be, in any suitable way.

$c\ c$ are comparatively small anti-friction rollers journaled in the plates $b\ b$ and arranged by preference slightly apart from each other in concentric circles large enough to leave a considerable central or axial opening between said rollers. It will now be perceived that if a pin serving as an axle for the trolley-wheel be passed through this axial opening freely a very great part of the friction heretofore common in devices of this class will be avoided; but I do not here intend to claim, broadly, an anti-friction bearing such as described.

D is a trolley-supporting pin or axle such as I have referred to, and as one purpose of my invention is to diminish the friction I make this pin in part of any well-known so-called "anti-friction" metal, as shown at $c\ c$, the remaining part being made of harder metal.

E is the trolley yoke or stock. This I make in two parts $d\ d$, which are substantially alike and clamped together by means of nuts $e$ and $e'$, run on a screw on the parts $d\ d$. The upper end of this yoke is forked to receive the trolley-wheel, and through this end I pass the pin D, which, being headed at one end, as shown, I secure firmly in place by means of lock-nuts $f f$. In form this stock is hollow or open vertically through its center, in which, however, are lateral extensions $g\ g$ to receive a metallic conducting-rod F to take the current to the motor, and this rod I secure at its upper end to the parts $g\ g$ by means of jam-nuts $h\ h$. This yoke I make of metal, and I apply it in any suitable way to the heretofore common wooden arm G.

To insure constant contact between the yoke and trolley-wheel, I employ one or more yielding pins $k\ k$, passing through the yoke and pressed upon by spiral springs $l\ l$, arranged in small chambers $m\ m$, closed by screw-caps $n\ n$.

H H are knockers projecting inwardly or toward the overhead wire and arranged to alternate on the opposite sides of the trolley-flanges. The purpose of these knockers is to keep the wire free from snow and ice.

The parts now described, with the exception of the wooden pole or arm referred to, being all made of metal and furnishing a circuit from the overhead wire to the conducting-rod E, it is not essential that the latter should have other connection with the yielding pins $k\ k$.

Having thus described my invention, what I claim as new, and desire to secure by Letters Patent, is—

1. The combination, in a trolley device of the class hereinbefore referred to, of a trolley-wheel having a comparatively large central opening or chamber $a$, a group of concentrically-arranged anti-friction rollers $c\ c$, passing across said chamber and journaled in said wheel, and a trolley axle or bearing made in part of anti-friction metal and passing centrally between the rollers forming said group, substantially as and for the purposes specified.

2. A trolley-wheel for cars propelled electrically through an overhead circuit, such wheel being provided on the interior faces of its flanges for receiving said wire with a series of knockers H H, substantially as and for the purposes specified.

3. A trolley yoke or stock made in two like parts $d\ d$, clamped together by means of nuts $e\ e'$, run upon and encircling the said parts, substantially as shown and described, and for the purposes set forth.

4. The combination, with the stock and wheel of a trolley device for cars propelled electrically through an overhead wire, of one or more laterally-yielding contact-pins $h\ h$, substantially as and for the purposes specified.

Signed at Waterloo, in the county of Seneca and State of New York, this 5th day of March, A. D. 1891.

JOHN W. BEEBE.

Witnesses:
CHAS. D. BECKER,
FRANCIS E. HOLLERAN.